Sept. 2, 1969  E. PORTH  3,464,691
ROLL BEARING ARRANGEMENTS FOR USE IN PAPER-PROCESSING
MACHINES, IN PARTICULAR FOLDING MACHINES
Filed April 3, 1967  3 Sheets-Sheet 1

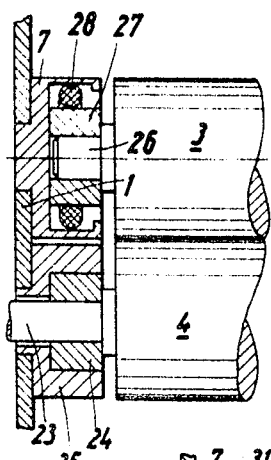
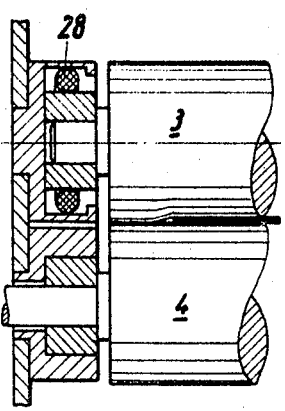
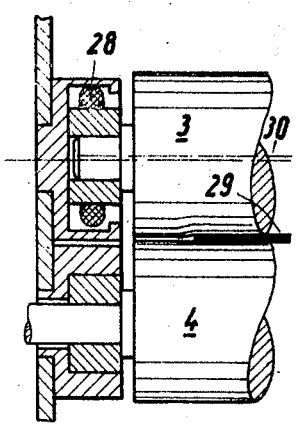
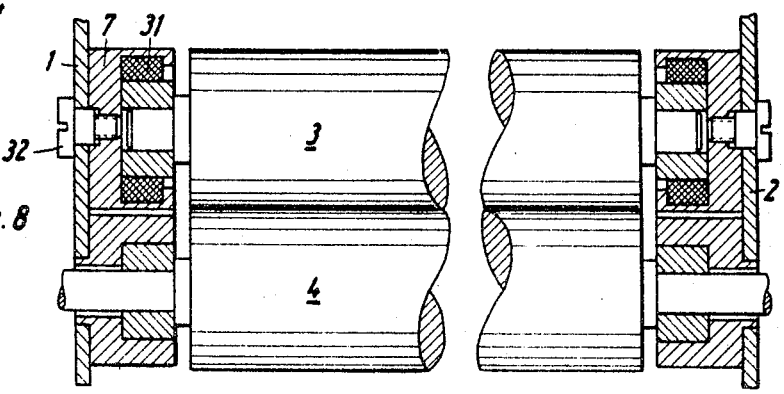
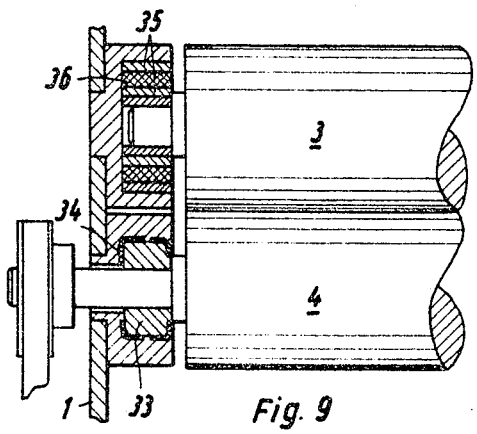
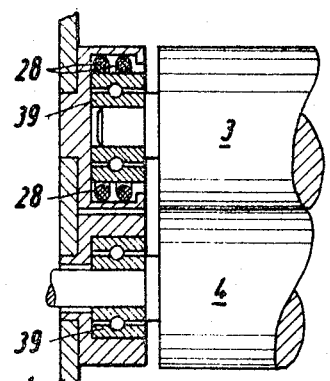

United States Patent Office 3,464,691
Patented Sept. 2, 1969

3,464,691
ROLL BEARING ARRANGEMENTS FOR USE IN PAPER-PROCESSING MACHINES, IN PARTICULAR FOLDING MACHINES
Erwin Porth, St. Georgen, Black Forest, Germany, assignor to Mathias Bauerle Gesellschaft mit beschrankter Haftung, St. Georgen, Black Forest, Germany, a German company
Filed Apr. 3, 1967, Ser. No. 628,055
Claims priority, application Germany, May 2, 1966, 86,929
Int. Cl. B65h 5/06, 17/20; F16c 27/04
U.S. Cl. 271—51                                                    9 Claims

ABSTRACT OF THE DISCLOSURE

A roll arrangement for use in paper folding machines including two metal surfaced drive rolls, at least one rubber surfaced driven roll, and at least one folding pocket. The drive rolls have a fixed mounting and the driven roll has a resilient mounting to allow for radial movement of the driven roll relative to each of the drive rolls so that the driven roll can be radially displaced to accommodate paper of one thickness passing between the driven roll and one of the drive rolls to the folding pocket, and at the same time, accommodate paper of another thickness passing between the driven roll and the other of the drive rolls.

---

Figure 1:
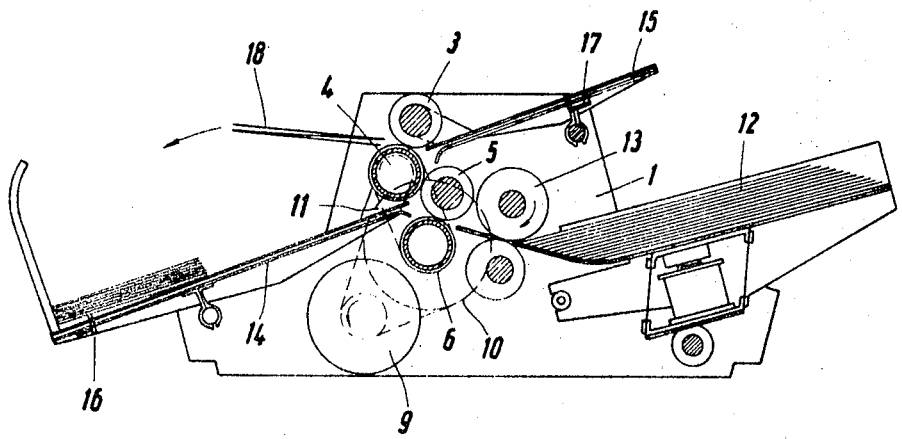

The present invention relates to improvements in roll bearing arrangements in paper processing machines, in particular folding machines.

In the context of office folding machines, which must be very light and simple in their construction and which should require no special training on the part of the operator, the invention renders it possible at the expense of a minimum in terms of outlay and setting up work to satisfactorily fold papers of differing qualities and thicknesses.

Tests have shown that with a simplification of the bearing design the tendency to breakdown of the bearing arrangements provided for the roll neck journals can substantially be overcome by providing a resilient mounting of the roll ends so that the rolls can deflect in all directions, i.e. radially. Due to bearing arrangements of this kind, the axis of the roll can also shift slightly in the lateral direction relative to the axis of the fixed roll and can deflect in the event of some unforeseen loading. It has been found that with a bearing arrangement of this kind the desired result can be achieved even where the material is irregularly fed into the installation, resilient deflection in all directions being achieved. A radially resilient bearing arrangement additionally has the advantage that vibrations and shocks are better absorbed since the attendant forces are more quickly dampened, a radially resilient bearing arrangement acting as a shock absorber in this context. An important feature of the invention is that the adjustable folding roll is radially and resiliently mounted at its ends, in relation to its own axis. A bearing arrangement of this kind can for example be achieved by the use of balls of resilient material arranged in a ring around the roll journals. These balls may for example be constituted by a steel core provided with a coating of elastic material. The elastic material may be synthetic rubber, natural rubber or some kind of plastic, i.e. synthetic material. In a preferred embodiment of the invention, the adjustable folding roll is given a radial degree of freedom between its journal and bearing bush on the one hand and the fixed bearing housing on the other, by the interposition of resilient support rings or support rings of elastic material. It is advantageous in this context to coat the resiliently mounted roll with rubber or some other resiliently deformable material. The rubber rolls may have independent drive arrangements but may equally well be friction-driven by the steel rolls. A variety of possibilities are available where the design of the rings of elastic material is concerned. In a particularly simple design, the cross-section can be circular. In this instance, the degree of movement at the commencement of loading is somewhat greater. Equally, however, the ring can have a rectangular cross-section. In such an instance, the resistance to compression at the commencement of loading is generally high. Also, the resilient bearing arrangement can be constituted by a bearing housing which at the same time has the effect of cutting down noise.

The invention has the advantage that the folding rolls automatically adapt to the paper thickness, and therefore require no adjustment, are simple to manufacture from the piece part point of view. Furthermore, no slotted guides or elongated holes need to be produced in the side frames, instead, it is merely necessary to provide fixed holes in the plates. In addition, the noise arising during operation of the rolls is largely cut down by the arrangement in accordance with the invention.

The invention will now be described with reference to the accompanying drawings which show an embodiment of the invention but in no restrictive sense.

Figure 2:
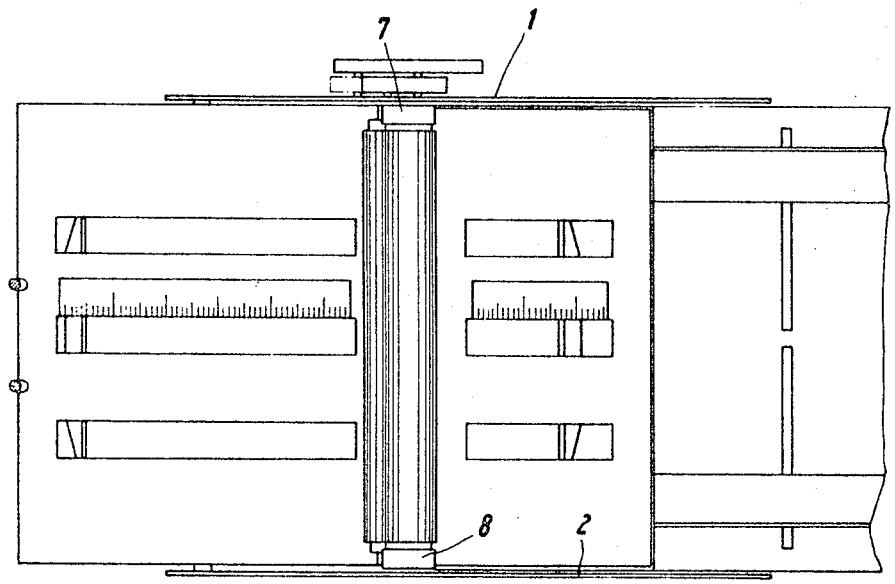
Figure 3:
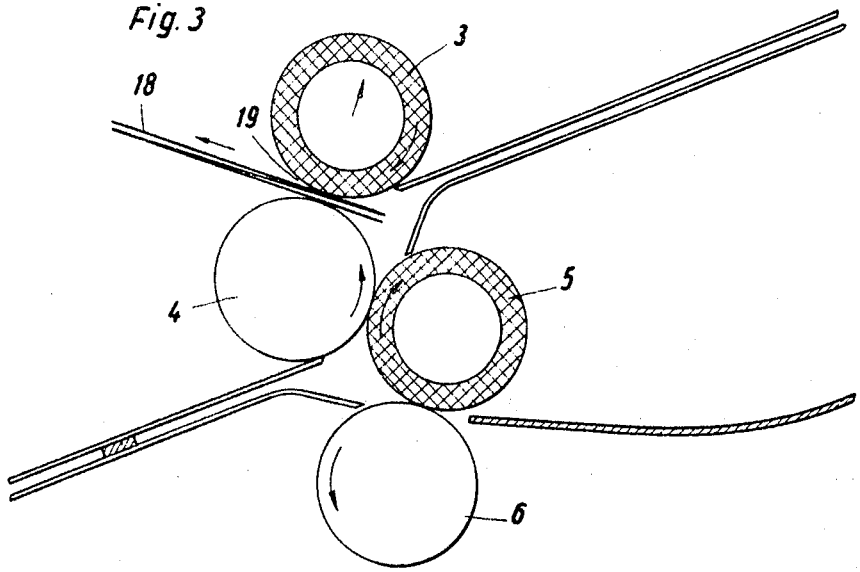
Figure 4:
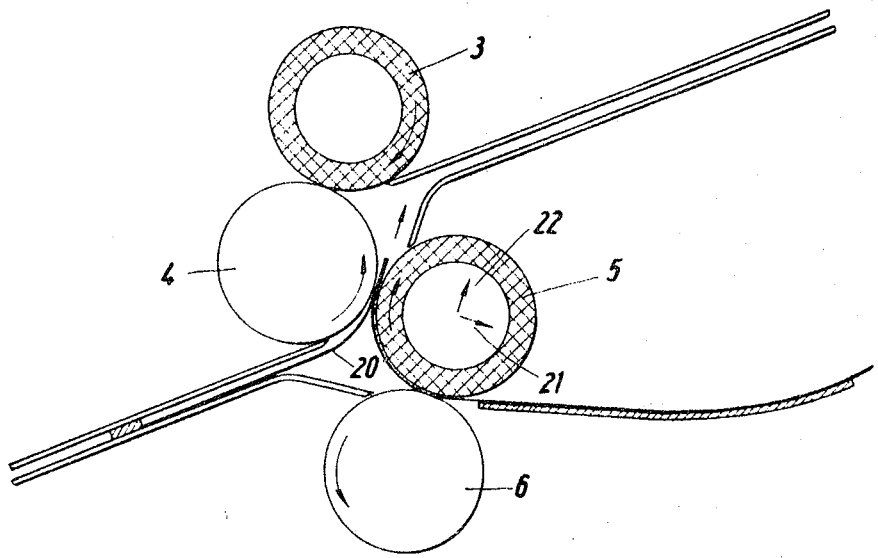

FIGURE 1 illustrates a section through the folding machine;
FIGURE 2 is a plan view of a folding machine;
FIGURES 3 and 4 are sections through the pairs of folding rolls;
FIGURES 5, 6 and 7 schematically illustrate the bearing arrangements when papers of different thicknesses are being fed through the installation;
FIGURE 8 illustrates a pair of folding rolls with the bearing arrangements;
FIGURE 9 illustrates a roll bearing arrangement designed specially to damp out noise;
FIGURE 10 illustrates a folding roll bearing arrangement which uses ball races.

Between the side plates 1 and 2 of the frames, the folding rolls 3, 4, 5 and 6 are rotatably mounted in bearing housings 7 and 8. The folding rolls 6 and 4 are of metal and are synchronously driven by the drive motor 9, acting through a pulley 10 and a belt 11. The rubber rolls 3 and 5 are resiliently mounted and are driven by frictional contact with the steel rolls. The sheet 12 of paper which are to be folded are conveyed to the folding rolls by the feed roller 13. The folding pockets 14 and 15 with the adjustable stops 16 and 17 produce a parallel crease in each sheet of paper. The finish-folded sheet 18 drops into the first pocket 14 and a stack is formed there. In FIGURE 3, a folded sheet 18 is leaving the folding roll, the rubber roll 3 is lifted by three times the paper thickness to form roll pass gap 19. The rubber roll 5 is here in its normal position. FIGURE 4 shows a sheet 20 between steel roll 4 and rubber roll 5, this sheet passing doubled through the rolls and thus displacing the roll centre in the direction of the arrows 21 and 22. FIGURE 5 illustrates the two rolls 3, 4 in the zero position, in which they are in contact with one another. The drive journal 23 of the steel roll 4 runs in the bushing 24 which is made of a suitable bearing material. Journal 25 is fixed to the side frame 1. Bearing journal 26 of the rubber roll 3 runs in the bushing 27 which is centered in the bearing housing 7 by the resilient support ring 28. FIGURE 6 shows the passage of a thin paper through the rolls, only the rubber surface of the rubber roll 3 being deformed, and not the resilient support ring 28. From FIGURE 7, it can be seen that where thicker materials 29 are passed through, the axis of the folding roll is displaced, in fact by the distance 30, and the resilient support ring 28 distorts. As the distortion increases the spring force exerted by the resilient support ring 28 increases. After the paper has passed through, the resilient support ring 28 returns to its centered or normal position. The essential concept shown in FIGURES 5 to 7 resides in the fact that the resilient deformability of the roll periphery 3 and the resilience in the support ring 28, results in a harmonic spring action being exerted in relation to the different paper thicknesses. A maximum paper thickness of about 1 mm. is the basis used here. In accordance with FIGURE 8, instead of a resilient support ring of circular cross section, a support ring 31 of rectangular cross-section may be used. Where the fixing of the bearing housing 7 is concerned, it is also possible to employ a dowelled setscrew 32, which makes it possible to rapidly remove folding roll 3 complete with the bearing housings, from the frame. This facility is extremely important where the exchange of worn rubber rolls is concerned.

In FIGURE 9, two examples of the invention have been illustrated. In the case of the upper roll 3, the radially resilient bearing arrangement consists of a composite ring having metal rings 35 arranged both inside and outside. Between these metal rings, a resilient intermediate ring 36 is provided. Conveniently, this triple-layer bearing ring will as far as possible be produced ready for assembly. In conjunction with the bottom roll 4, at the outside of the bearing bushings 33, an element 34 of synthetic material is provided, which has a noise-dampening effect. This at least cuts down the noise consequent upon the rolling action of the rolls. An arrangement of this kind could be used in association with the roll 3 as well.

FIGURE 10 illustrates a further embodiment of the invention. In this embodiment both rolls 3 and 4 are provided with ball bearings. In the case of the roll 3 having a coating of resiliently deformable material, in addition two resilient support rings 28 are provided which co-operate with the ball bearing 39. This example shows that by the provision of two or more resilient rings the elastic properties of the bearing can to a large extent be controlled.

I claim:
1. A roll arrangement for paper folding machines comprising two spaced apart rolls having rigid surfaces, a third roll having a resiliently deformable surface and normally arranged in driving contact with each of the first and second rolls, each of said first and second rolls having a fixed mounting and said third roll having a resilient mounting for allowing radial displacement relative to each of said first and second rolls, whereby said third roll can be simultaneously radially displaced to accommodate paper of different thicknesses between it and each of said first and second rolls.

2. A roll arrangement as claimed in claim 1 wherein each of said first and second rolls is a drive roll and said third roll is a driven roll.

3. A roll arrangement as claimed in claim 2 wherein a folding pocket is positioned at the exit of said first and third rolls to facilitate the folding of the paper.

4. A roll arrangement as claimed in claim 3 wherein a second folding pocket is positioned at the exit of said second and third rolls, and a fourth roll is provided having a resiliently deformable surface and a resilient mounting for allowing radial displacement relative to said second roll.

5. A roll arrangement as claimed in claim 4 further comprising a bearing journal extending from each end of each of said first and second rolls, a bushing being disposed on each of said bearing journals, a fixed bearing housing being spaced from said bushing, and said resilient mounting being disposed between said fixed housing and said bushing.

6. A roll arrangement as claimed in claim 5 wherein said resilient mounting is formed as a resilient support ring.

7. A roll arrangement as claimed in claim 5 wherein said resilient mounting is a pair of metal rings with a resilient ring therebetween.

8. A roll arrangement as claimed in claim 5 wherein said bushing is formed as a ball bearing and said resilient mounting is formed as a pair of resilient rings.

9. A roll arrangement as claimed in claim 1 wherein each of said first and second rolls has a journal bearing at each end thereof with bushings disposed therein and synthetic elements formed about the bushings for noise-dampening.

References Cited

UNITED STATES PATENTS

| 1,980,580 | 11/1934 | Gilmore | 308—26 X |
| 2,114,670 | 4/1938 | Searles | 308—26 |
| 2,162,159 | 6/1939 | Cole | 308—26 |
| 3,107,946 | 10/1963 | Drake | 308—26 X |
| 3,297,223 | 1/1967 | Bueker | 308—26 X |
| 3,357,758 | 12/1967 | Miller | 308—26 |

FOREIGN PATENTS

| 644,323 | 4/1937 | Germany. |
| 12,514 | 5/1898 | Great Britain. |

CARROLL B. DORITY, JR., Primary Examiner

U.S. Cl. X.R.
226—187, 194; 271—81; 308—26